United States Patent
Massengill

(10) Patent No.: US 11,168,652 B1
(45) Date of Patent: Nov. 9, 2021

(54) SNORKEL SYSTEM AND METHOD OF MAKING AND USING THE SAME

(71) Applicant: Dustin Laurence Massengill, Greenville, NC (US)

(72) Inventor: Dustin Laurence Massengill, Greenville, NC (US)

( * ) Notice: Subject to any disclaimer, the term of this patent is extended or adjusted under 35 U.S.C. 154(b) by 0 days.

(21) Appl. No.: 17/026,686

(22) Filed: Sep. 21, 2020

(51) Int. Cl.
  *F02M 35/08* (2006.01)
  *B60K 13/02* (2006.01)
  *F02M 35/10* (2006.01)
  *F02M 35/16* (2006.01)

(52) U.S. Cl.
  CPC .......... *F02M 35/088* (2013.01); *B60K 13/02* (2013.01); *F02M 35/10209* (2013.01); *F02M 35/10255* (2013.01); *F02M 35/10373* (2013.01); *F02M 35/162* (2013.01)

(58) Field of Classification Search
  CPC ............ F02M 35/088; F02M 35/162; F02M 35/10255; F02M 35/10209; F02M 35/10373; B60K 13/02
  See application file for complete search history.

(56) References Cited

U.S. PATENT DOCUMENTS 4,360,037 A * 11/1982 Kendall ............... B01D 25/38
  137/242
2017/0130682 A1* 5/2017 Tallman ........... F02M 35/10013

FOREIGN PATENT DOCUMENTS

DE      3736777 C1 * 12/1988 ........... F02M 35/168
WO   WO2005108201 A1 * 11/2005

* cited by examiner

*Primary Examiner* — Jacob M Amick
*Assistant Examiner* — Charles J Brauch
(74) *Attorney, Agent, or Firm* — Ashley D. Johnson; Dogwood Patent and Trademark Law

(57) ABSTRACT

The presently disclosed subject matter is generally directed to a system and method of protecting vehicle engines by preventing water from entering the belt drive and/or air intake of the vehicle motor. The disclosed system includes a housing and one or more snorkels that extend in an upward direction from the housing. Each snorkel includes a water sensor that detects the level of water outside of the vehicle. When water reaches the snorkel maximum depth and triggers the sensor, valve within the housing closes to divert water away from the motor. Once the vehicle is back on dry land, the user can reset the valve to the open position.

20 Claims, 11 Drawing Sheets

SNORKEL SYSTEM AND METHOD OF MAKING AND USING THE SAME

TECHNICAL FIELD

The presently disclosed subject matter is generally directed to a snorkel system for use with a wide variety of all-terrain vehicles, and to methods of making and using the disclosed system.

BACKGROUND

ATVs (All Terrain Vehicles) have consistently increased in popularity over the past several years due at least in part to their ability to be effectively used in many different environments. For example, these vehicles are frequently used in marshes, swamps, streams, rivers, and the like. However, when used in these environments, the vehicles commonly intake water which negatively affects the motor. Specifically, water can be drawn into the motor, clutch housing, air intake, and/or transmission causing serious damage or inoperability. Several million dollars are spent annually in the United States repairing ATVs that have ingested water and/or mud. Accordingly, many attempts have been made in an effort to prevent excessive motor contact with water. For example, external motor covers with elongated air intakes have been provided (typically referred to as "snorkel systems"). However, these covers only protect the vehicle up to a predetermined point of depth in the water. If the water is deeper, water and/or mud are easily drawn into the motor, resulting in engine damage. It would therefore be beneficial to provide a system and method for addressing these and other shortcomings of the prior art.

SUMMARY

In some embodiments, the presently disclosed subject matter is directed to a snorkel system for use with a vehicle. Particularly, the snorkel system comprises a snorkel and a housing. The snorkel includes a riser defined by a lower segment with a first open end, an upper segment with a second open end, a neck positioned between the first and second segments. The riser further includes an interior channel that spans the distance between the first and second open ends. The snorkel comprises a water sensor positioned in the riser neck. The system housing comprises a three-way valve defined by an inlet, an outlet, and a drain, wherein the three-way valve is switchable between a first position in which the inlet is selectively in fluid communication with the outlet and a second position in which the inlet is selectively in fluid communication with the drain. The housing further incudes a motor that drives the three-way valve to switch between the first position and the second position.

In some embodiments, the snorkel further comprises a base operatively connected to the first open end of the riser.

In some embodiments, the three-way valve drain comprises a flap covering the drain when the three-way valve is in the first position.

In some embodiments, the system further comprises a filter positioned at the valve inlet.

In some embodiments, the housing comprises 1, 2, or 3 three-way valves.

In some embodiments, the system further comprises a connector shaft that joins the motor and each three-way valve.

In some embodiments, the motor controls each three-way valve simultaneously.

In some embodiments, the water sensor extends through a face of the riser.

In some embodiments, the snorkel further comprises a screen that at least partially surround the water sensor within the neck.

In some embodiments, the second open end comprises a lip or overhang.

In some embodiments, the system further includes a control unit that allows the valve to be reset to the first position.

In some embodiments, the presently disclosed subject matter is directed to a method of diverting water through a snorkel system. Particularly, the method comprises positioning the three-way valve of the snorkel system in a first position. The snorkel system comprises a riser defined by a lower segment with a first open end, an upper segment with a second open end, a neck positioned between the first and second segments, and an interior channel that spans the distance between the first and second open ends. The system also includes a water sensor positioned in the riser neck. The system comprises a housing defined by a three-way valve defined by an inlet, an outlet, and a drain, wherein the three-way valve is switchable between a first position in which the inlet is selectively in fluid communication with the outlet and a second position in which the inlet is selectively in fluid communication with the drain. The housing also includes a motor that drives the three-way valve to switch between the first position and the second position. The method comprises receiving water in the interior channel of the riser, whereby the water activates the water sensor, triggering the motor to move the three-way valve to the second position. The method includes channeling the water from the snorkel to the three-way valve, thereby diverting water from the system through the drain.

In some embodiments, the outlet is operably connected to a vehicle motor.

In some embodiments, the vehicle is an all-terrain vehicle.

In some embodiments, the motor moves a flap to expose the drain when the three-way valve transitions to the second position.

In some embodiments, the method further comprises passing the water through a filter positioned at the valve inlet prior to entering the three-way valve.

BRIEF DESCRIPTION OF THE DRAWINGS

FIG. 5b is a side plan view of the filter system of FIG. 5a.

DETAILED DESCRIPTION

Figure 1:
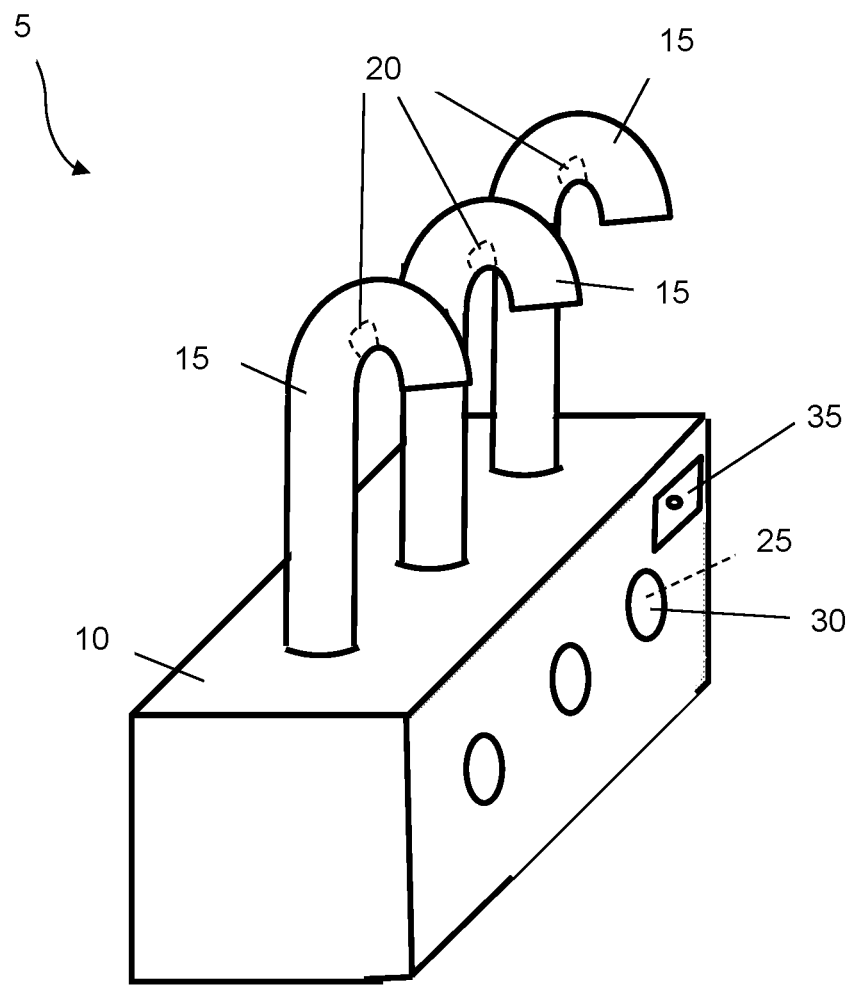
FIG. 1 is a perspective view of a snorkel system in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The presently disclosed subject matter is generally directed to a system and method of protecting the engines of ATVs by preventing excessive water from entering the belt drive and/or air intake of the vehicle motor. The term "ATV" as used herein refers to any of a wide variety of vehicles suitable for use in varying terrains, such as four wheelers, side-by-sides, Humvees®, Jeeps®, and the like. FIG. 1 illustrates one embodiment of snorkel system 5 that includes housing 10 and one or more snorkels 15 that extend in an upward direction from the housing. The term "snorkel" as used herein refers to a conduit that provides a pathway for air and/or water from the outside environment to a housing. Each snorkel 15 includes water sensor 20 that detects the level of water (e.g., salt water, fresh water, muddy water, etc.) outside of the vehicle, such as when the operator is driving through a body of water. When water reaches the snorkel maximum depth and triggers the sensor, an internal valve within the system housing closes to prevent water from entering the motor, as discussed in more detail herein below. The valve diverts water through a series of drain holes 25 that are covered by flaps 30 when not in use. Once the ATV is back on dry land, the user can reset the valve (e.g., by using controls 35) to the open position. Advantageously, the disclosed system effectively prevents water, mud, and debris from contacting the vehicle motor and causing damage.

Figure 2A:
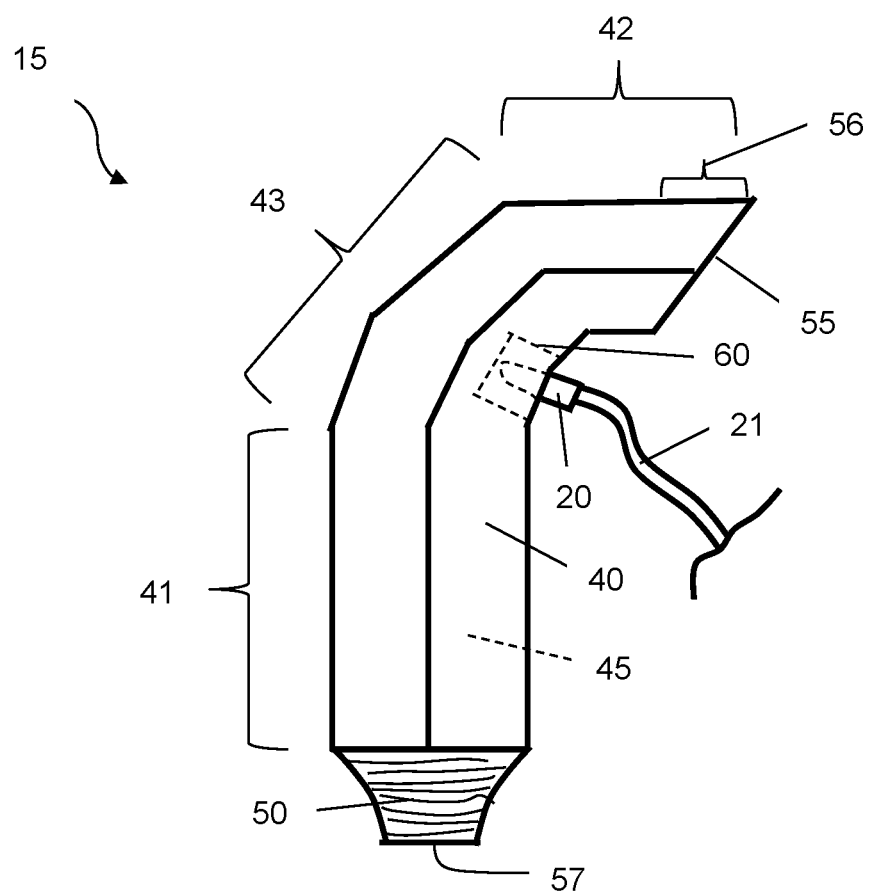
FIG. 2a is a side plan view of a system snorkel in accordance with some embodiments of the presently disclosed subject matter.
Figure 2B:
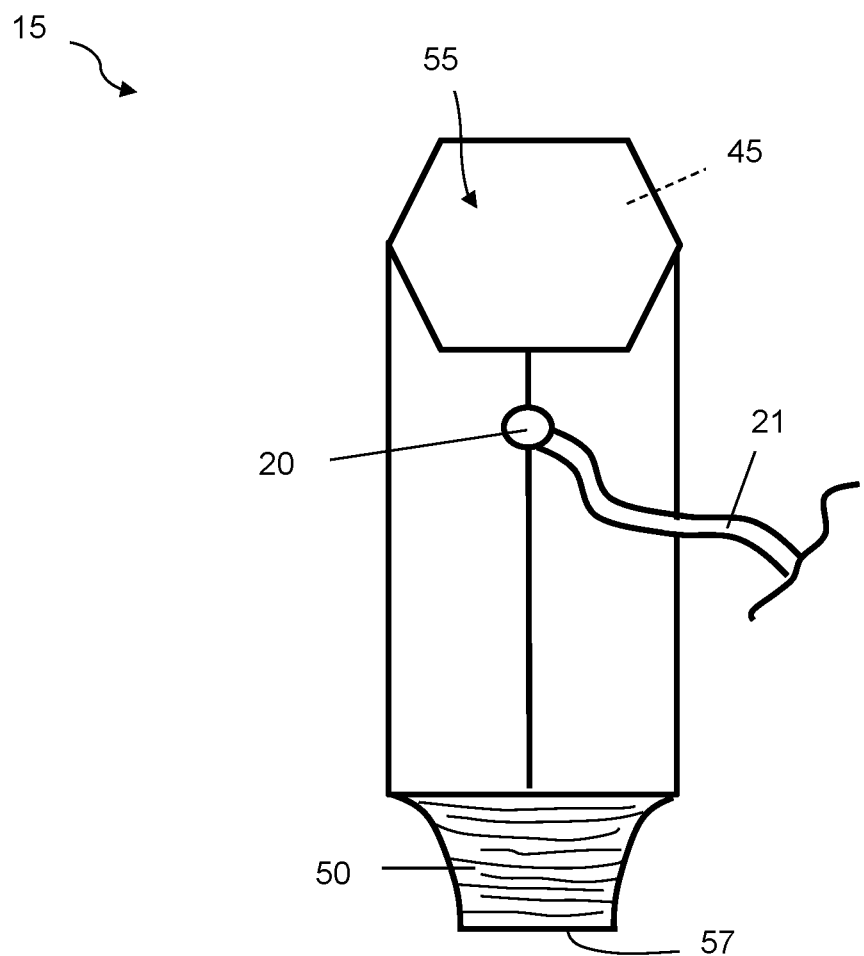
FIG. 2b is a front plan view of a system snorkel in accordance with some embodiments of the presently disclosed subject matter.

FIGS. 2a and 2b illustrate one embodiment of snorkel 15. As shown, snorkel 15 includes riser 40 comprising lower segment 41, upper segment 42, and neck 43 that spans the distance between the upper and lower segments. The snorkel is configured to include interior channel 45 that extends the entire length of the snorkel. The snorkel thus acts as a conduit having first and second open ends. Water sensor 20 is positioned within the interior snorkel channel at neck 43. Riser 40 can also include base 50 that allows the riser to be permanently or releasably attached to housing 10.

Upper segment 42 of the riser includes opening 55 that acts as an elongated channel open to the atmosphere. Opening 55 thus provides an entryway for water, air, and other fluids to enter the snorkel interior channel. As the water enters opening 55, it flows down and through interior channel 45 due to the angle of neck 43 and gravity. As the water flows down the interior channel, it contacts water sensor 20, which triggers the diverting of the water away from the vehicle motor, as discussed below. In some embodiments, opening 55 includes lip 56 that reduces the likelihood of excessive influx of water into the interior channel, such as when raining and/or if the vehicle momentarily slips below water. Lip 56 can have any desired shape and configuration and can be straight, curved, and/or angled to provide an overhang to opening 55.

Water sensor 20 can be any type of water sensor known or used in the art. For example, in some embodiments the sensor can include a water-detecting probe. In other embodiments, the water sensor comprises first and second electrodes forming a capacitor, where the electrodes are dimensioned to provide a variable capacitance in response to exposure to water. Any known water sensor can be used. The water sensor can pass through one face of the snorkel such that the water-sensing portion is housed within interior channel 45 and sensor wiring 21 is external to the snorkel to allow connection to a control box. In some embodiments, the water sensor can be configured to wirelessly send a notification to the control box, such that wiring 21 is optional.

Figure 3:
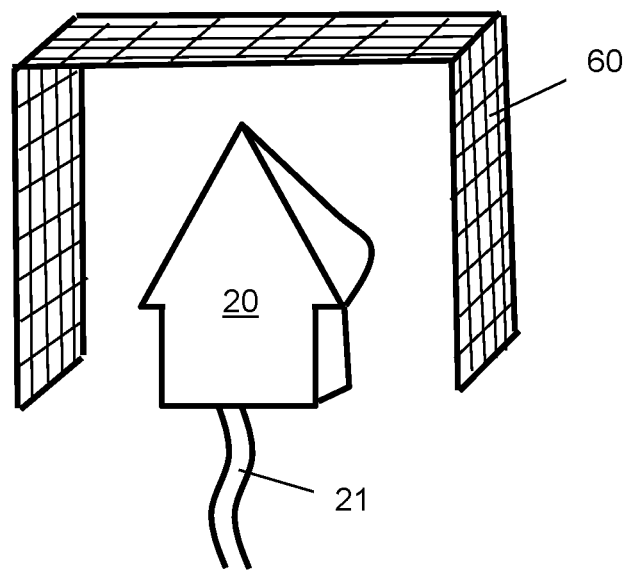
FIG. 3 is a perspective view of a water sensor comprising a protective screen in accordance with some embodiments of the presently disclosed subject matter.

In some embodiments, the water sensor includes screen 60 that surrounds at least a portion of the sensor housed within the interior channel, as illustrated in FIG. 3. Thus, the screen can be positioned adjacent to a portion of the water sensor housed within interior channel 45. Alternatively, the screen can surround the water sensor housed within the channel. The screen functions to protect the water sensor from false readings, such as when rain enters the interior channel or splashes occur. In addition, the screen can further protect water sensor 20 from damage due to contaminants (e.g., sticks, twigs, leaves) present in the water flowing through the interior channel. The term "screen" broadly refers to any element that selectively allows fluid to pass through but excludes larger items, such as dirt, rocks, etc. Screen 60 can be constructed from any desired material, such as (but not limited to) metal, wire, plastic, and the like.

In some embodiments, each snorkel riser includes a single water sensor configured in neck 43. However, the presently disclosed subject matter is not limited and each snorkel can include multiple water sensors 20 positioned at varying locations along the interior channel (e.g., in neck 43, lower segment 41, and/or adjacent to the riser base).

In some embodiments, neck 43 can be curved (as shown in FIG. 2a) or at an angle (e.g., L-shaped). The curve of the neck can be configured such that the angle between the upper and lower segments is about 90 degrees. However, the angle of neck 43 is not limited and can be acute or obtuse. Further, lower section 41 can be approximately vertical, while upper section can be approximately horizontal in the use position. However, the upper and lower sections are not limited and can be angled as desired by the user or to accommodate a particular ATV. For example, it may be advantageous for upper section 42 to angle slightly downwards (towards neck 43) to encourage the flow of water through interior channel 45.

Lower riser segment 41 is connected to neck 43 and provides a pathway for water entering the interior channel to exit the riser. Specifically, water enters interior channel 45 through opening 55 in upper segment 42, travels down neck 43 into the lower segment and exits at base 50. The base includes aperture 57 that allows water exiting interior channel 45 to pass into housing 10 and be routed out of the system (e.g., away from the vehicle motor belt drive and/or air intake).

Base 50 can be attached to lower segment 41 using any known method, such as (but not limited to) the use of adhesives, welding, snap-fit attachment, pressure-fit attachment, locking rings, ratchets, latches, the use of mechanical closures (e.g., screws, clips, bolts, fasteners), or combinations thereof.

As set forth above, base 50 enables the riser to permanently or releasably attach to housing 10. Any known attachment element can be used, such as (but not limited to) the use of screw threads, magnets, clips, fasteners, or combinations thereof. In some embodiments, the connection between base 50 and the housing is water-tight to prevent the inadvertent leaking of water from the disclosed system.

In some embodiments, the snorkel riser can be configured as a single portion of material. In other embodiments, riser 40 can be configured in several portions that are joined together using any known method (e.g., welding, adhesive, magnets, screws, bolts, clips, and the like).

Snorkel riser 40 can be constructed with any desired cross-sectional shape. For example, the snorkel can have a circular, oval, square, rectangular, triangular, pentagonal, hexagonal, octagonal, diamond, or abstract shape.

Snorkel 15 (e.g., riser 40 and base 50) can be constructed from any desired rigid or semi-rigid material. The term "rigid" refers to the characteristic of being inflexible, with a high stiffness or modulus of elasticity. The term "semi-rigid" refers to the characteristic of being substantially or partially inflexible, with a stiffness or modulus of elasticity less than a corresponding rigid material. Suitable rigid and semi-rigid materials can therefore include (but are not limited to) plastic, metal, metal alloy, wood, stone, composites, and the like.

It should be appreciated that the disclosed snorkel system can include any desired number of snorkels. For example, the system can comprise 1-3 snorkels in some embodiments (e.g., 1, 2, or 3). However, the presently disclosed subject matter is not limited and system 5 can include greater than 3 snorkels if desired by the user.

In some embodiments, each snorkel in system 5 is configured to be about the same size and/or shape. However, the presently disclosed subject matter is not limited and at least one snorkel 15 can differ when compared to at least one other snorkel with respect to size and/or shape.

Figure 4A:
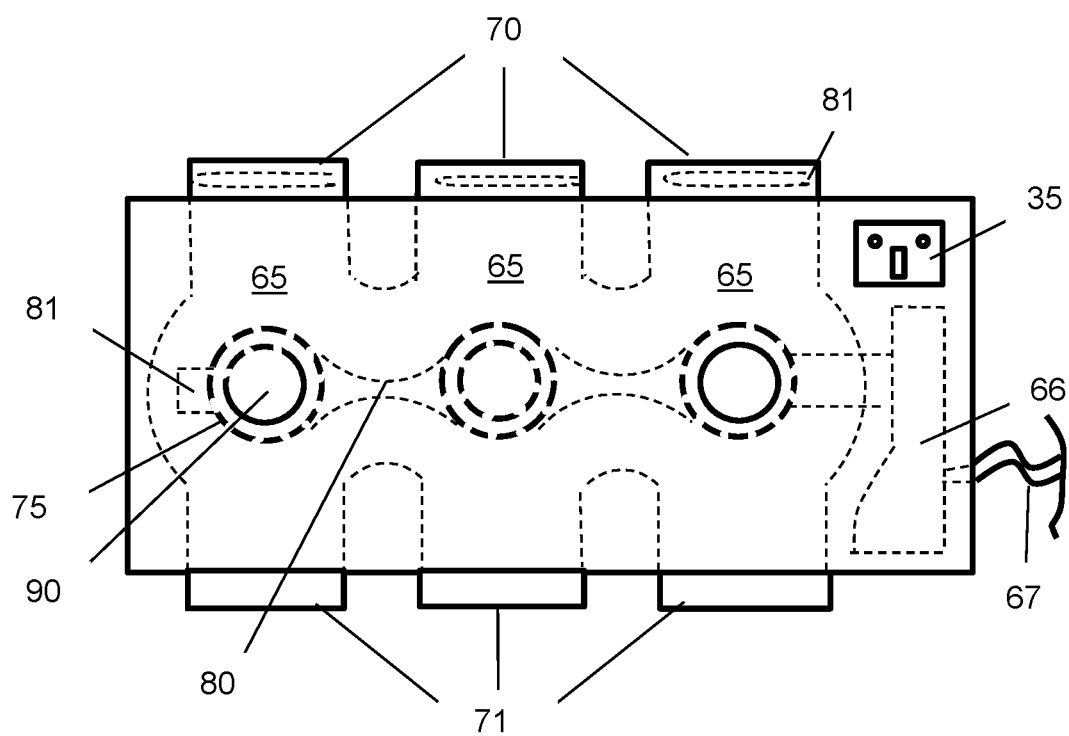
FIG. 4a is a front plan view of a snorkel system housing in accordance with some embodiments of the presently disclosed subject matter.
Figure 4B:
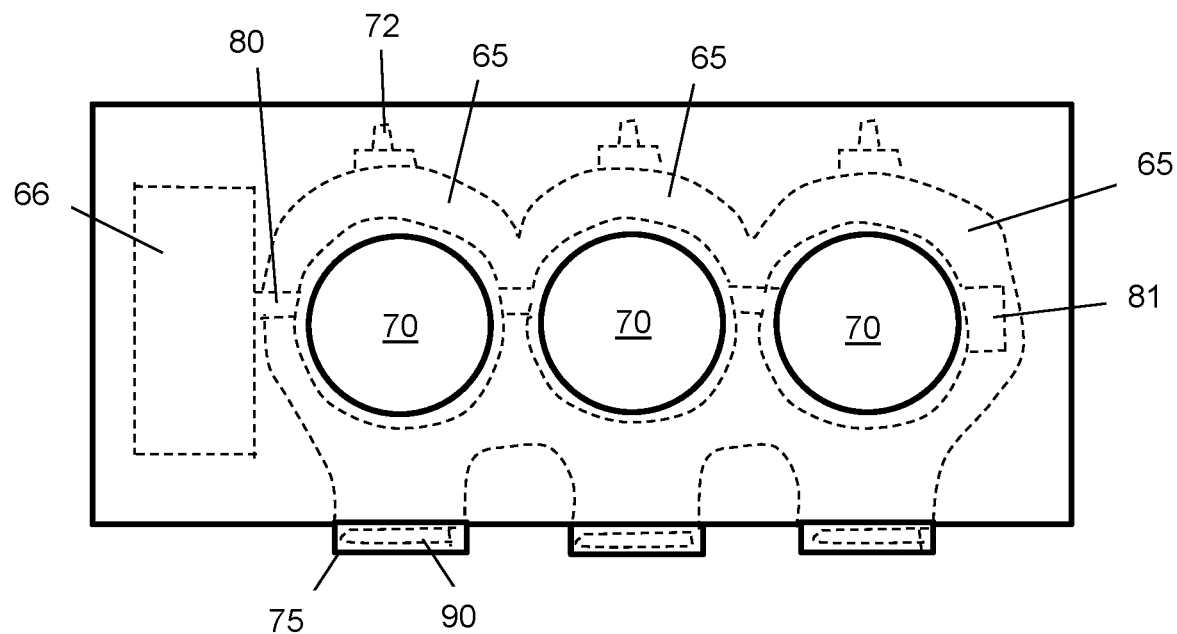
FIG. 4b is a top plan view of a snorkel system housing in accordance with some embodiments of the presently disclosed subject matter.

FIGS. 4a and 4b illustrate respective front and top views of housing 10. As shown, the housing includes one or more valves 65 and motor 66 that provides power to the valves. In some embodiments, the valves are connected in series, allowing the motor to control each valve simultaneously. Particularly, the valves can be connected via connector shaft 80 that spans from the motor to one or more bearings 81 that connect each of the valves to operate as a single unit. Bearing 81 can optionally be positioned at the end of the connector shaft to ensure proper positioning. In some embodiments, valves 65 are ball valves (e.g., 3-way ball valves). However, the presently disclosed subject matter is not limited and valve 65 can be configured any known valve, such as gate valves, butterfly valves, choke valves, diaphragm valves, gate valves, pinch valves, knife valves, and the like.

The term "valve" as used herein refers to any element that functions to control, redirect, restrict, or stop the flow of water. Each valve includes inlet 70 that cooperates with riser base 50 to allow the snorkel to be attached to the housing. For example, the riser base and the valve inlet can be attached through the use of adhesives, snap-fit attachment, pressure-fit attachment, mechanical elements (e.g., clips, fasteners, bolts, screws), screw thread arrangement, and the like. In some embodiments, the valve inlet is releasably attached to a corresponding riser base to allow for convenient servicing to an element of the system.

Figure 5A:
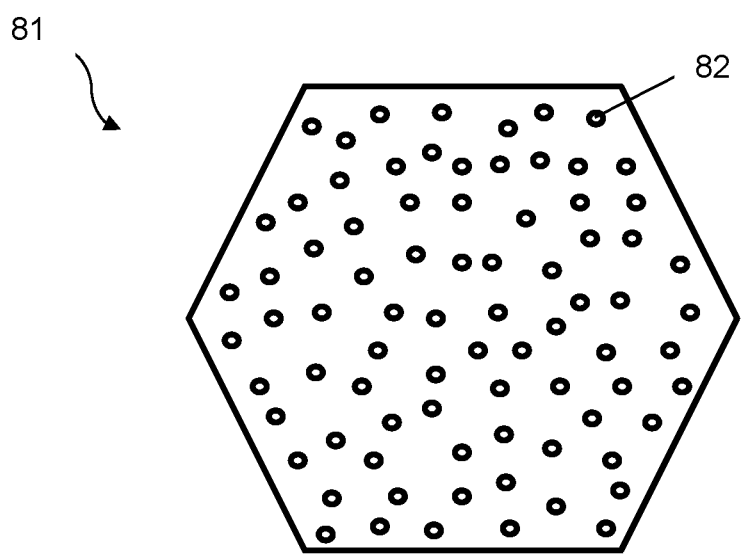
FIG. 5a is a top plan view of a system filter that can be used in accordance with some embodiments of the presently disclosed subject matter.
Figure 5B:
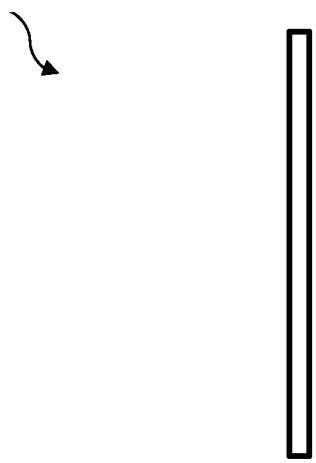

Inlet 70 is also where water exiting snorkel 15 enters the housing. Optionally, valve inlet 70 can include filter 81 that filters water passing into the valve. In this way, contaminants such as dirt, dust, debris, etc. are prevented from entering the valve interior. Filter 81 can include any element that prevents or reduces the incidence of such contaminants passing therethrough (e.g., separates solids from fluids). FIGS. 5a and 5b illustrate one embodiment of filter 81 comprising a series of orifices 82 that function to prevent dirt and other contaminants from entering the valve. However, it should be appreciated that filter 81 is not limited and can be configured in any desired shape, size, and/or construction.

Valves 65 further include outlet 71 positioned opposite from valve inlet 70. Outlet 71 connects to the vehicle motor. During dry conditions (i.e., prior to the water sensor being triggered), the valve is in the "open" position and allows air to flow through the snorkel, into the valve inlet, and through outlet 71 to contact the motor.

Each valve includes drain 75 that allows diverting of the water from the valve (e.g., instead of exiting outlet 71). Valve 65 can therefore be configured as a three-way valve. The term "three-way valve" refers to a valve that includes three different fluid ports that communicate with the valve. In this case, valve 65 includes inlet port 70, outlet port 71, and drain 75.

Each drain 75 includes flap 90 that can be opened and closed in response to the presence of water, as indicated by triggering of water sensor 20. Particularly, in response to directions from the control panel, flaps 90 can open or close, powered by motor 66. In some embodiments, flap 90 is a scupper flap.

In some embodiments, the valve can include barbed plug 72 for the vent lines, providing protection from water and/or dirt.

The housing can include any desired number of valves (e.g., 1, 2, or 3). For example, in some embodiments, the housing can be configured with a series of connected triple valves. However, the presently disclosed subject matter is not limited and can include greater than 3 valves in some embodiments.

Motor 66 can be any device that provides power to valves 65, allowing them to adjust (e.g., switch from open to closed configuration) in response to input from the water sensor (via system controls). In some embodiments, the motor can be an electric motor or a chemical motor (e.g., such as a gasoline motor). For example, motor 66 can be a 12V high torque motor. However, the presently disclosed subject matter is not limited, and any of a wide variety of motors can be used. In some embodiments, the motor can include wiring 67, allowing communication with the system controls.

Figure 6:
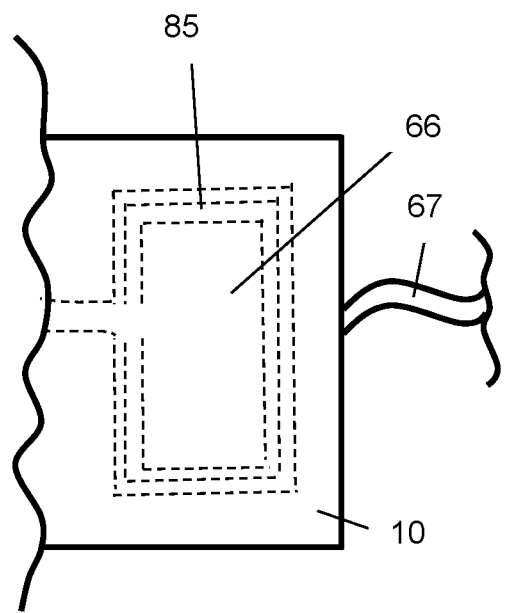
FIG. 6 is a fragmentary view illustrating a motor heat shield in accordance with some embodiments of the presently disclosed subject matter.

In some embodiments, motor 66 can include heat shield 85 that is positioned at least partially around the exterior of the motor, as shown in FIG. 6. For example, the heat shield can be configured to wrap around the motor to limit the amount of heat emitted from the motor during use. Heat shield 85 can include any material known or used in the art. For example, the heat shield can be constructed from any insulating material, such as (but not limited to) non-woven fibers, rubber, plastic, and the like.

Figure 7A:
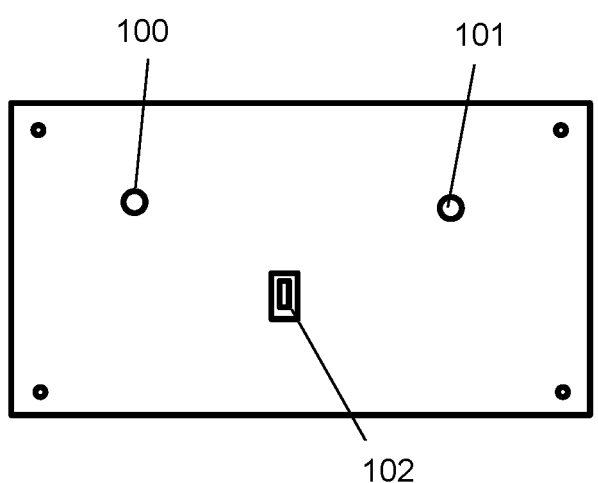
FIG. 7a is front plan view of a system control unit in accordance with some embodiments of the presently disclosed subject matter.
Figure 7B:
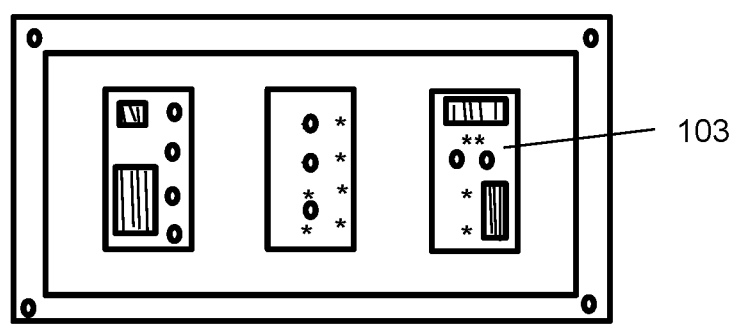
FIG. 7b is an interior view of the system control unit of FIG. 7a in accordance with some embodiments of the presently disclosed subject matter.
Figure 7C:
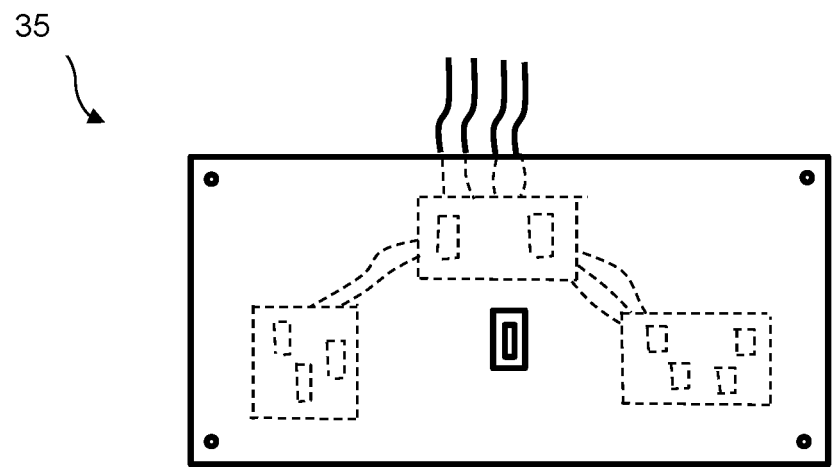
FIG. 7c is a front plan view illustrating wiring associated with a system control unit in accordance with some embodiments of the presently disclosed subject matter.

The system housing can further include control unit 35 that allows the operator to reset the valves to an "open" position (e.g., diverting air to the vehicle motor through outlet 71 instead of drain 75). FIG. 7a illustrates one embodiment of control unit 35 comprising valve "open" and "close" buttons 100, 101 and reset button 102. Each button can be controlled by a circuit board 103 and/or other associated wiring positioned on the opposing face of the control unit (e.g., interior to the housing), as shown in FIG. 7b. Wiring from the water sensor and/or motor can operably connect to the control unit, as illustrated in the embodiment of FIG. 7c.

It should be appreciated that the control unit buttons can be positioned in any desired location. In addition, the buttons are not limited to open, close, and reset. Rather, any of a wide variety of additional settings can be controlled by interacting with the control unit.

Figure 8A:
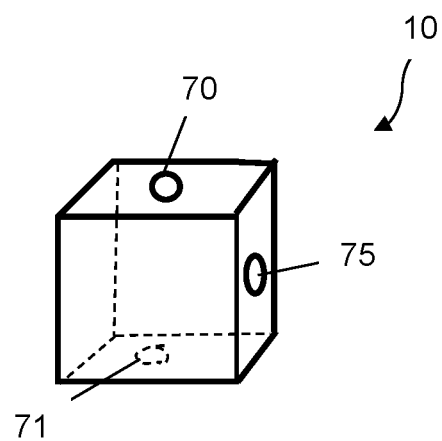
FIGS. 8a-8c are perspective views illustrating single, double, and triple valve system housings in accordance with some embodiments of the presently disclosed subject matter.
Figure 8B:
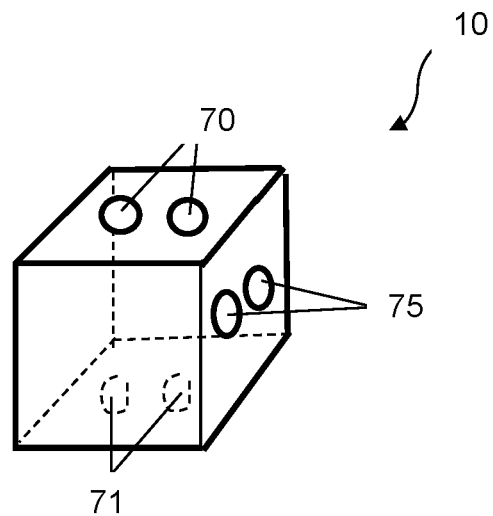
Figure 8C:
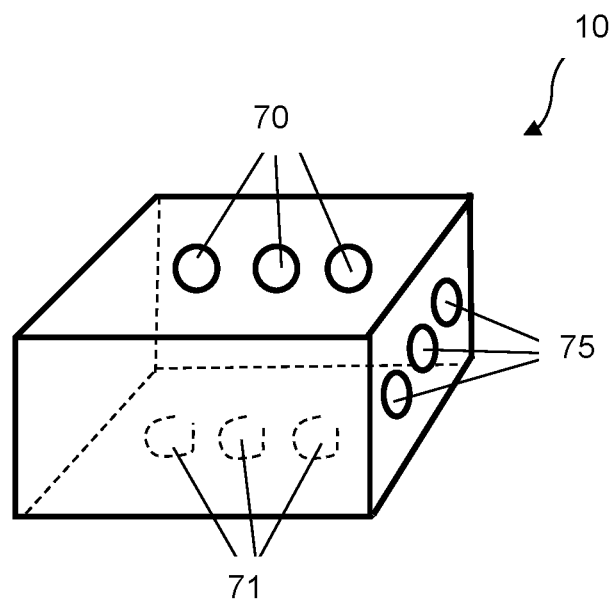

Housing 10 can have any desired shape, so long as it can accommodate the valve(s), motor, and associated elements. For example, FIGS. 8a-8c illustrate three variations of housing 10 suitable for single, double, and triple valve configurations, respectively.

In some embodiments, one or more faces of the housing can be removed from adjacent faces to allow for easy access to the internal components for repair and/or servicing. The faces of the housing can be held together using any known mechanism, such as the use of screws, bolts, and the like. It should be appreciated that the presently disclosed subject matter is not limited, and one or more faces of housing 10 can be permanently joined together.

Housing 10 can be constructed from any rigid material that resists breaking and/or bending in response to an applied force. Suitable materials can therefore include (but are not limited to) metal (e.g., stainless steel), polymeric material, wood, or combinations thereof.

Figure 9A:
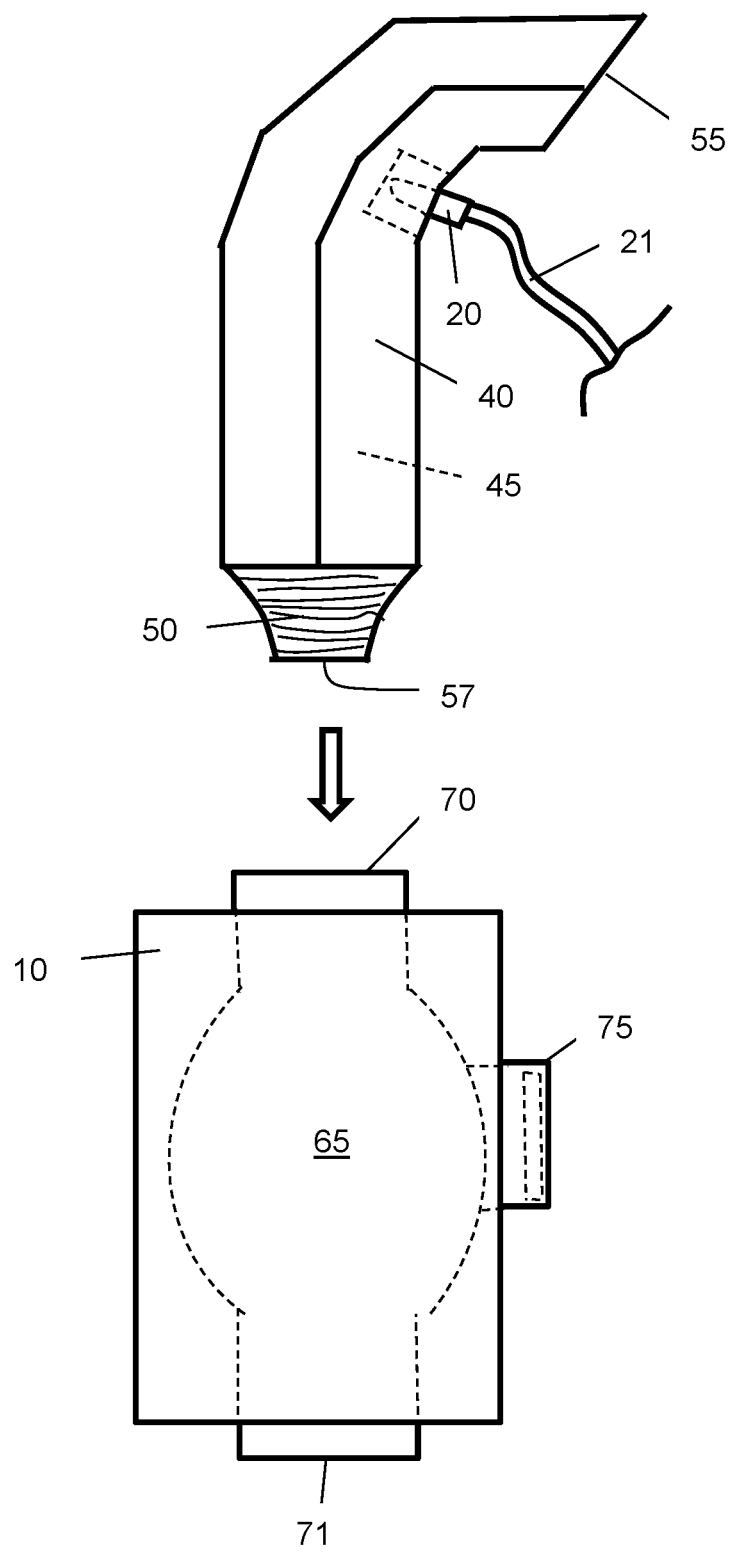
FIGS. 9a and 9b are side plan views of one method of assembling the mounting system in accordance with some embodiments of the presently disclosed subject matter.
Figure 9B:
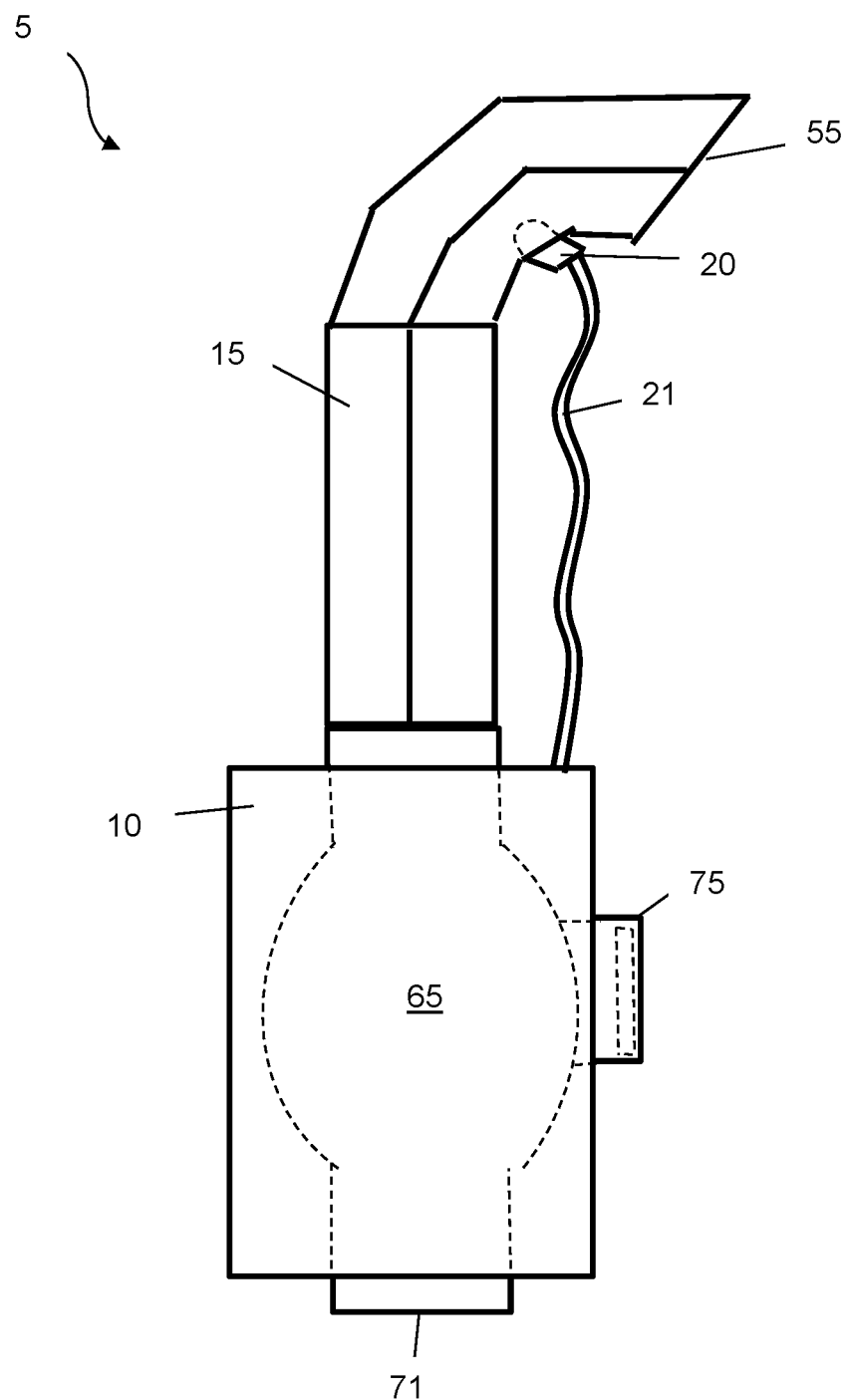

In use, snorkel 15 is permanently or releasably attached to housing 10, as illustrated in FIG. 9a. Particularly, snorkel base 50 is inserted into valve inlet 70 using any desired method (e.g., the use of screw threads) to arrive at the configuration of FIG. 9b. It should be appreciated that valve outlet 71 is operably attached to a vehicle motor (not shown). When the vehicle is being used in dry conditions (e.g., the water sensor has not been triggered), valve 65 is in the open position, and allows flow of air from snorkel opening 50 into the valve inlet 70 to exit at outlet 71.

When the ATV is being used at a water depth that exceeds the height of snorkel opening 55, water travels into the interior compartment of the snorkel from opening 55 to base 50. As the water travels through internal channel 55, it contacts water sensor 20. Upon sensing water, the water sensor signals motor 66 to divert the valve so that the water enters the valve at inlet 70 and exits through drain 75 rather than valve outlet 71. In this way, water is prevented from entering the vehicle motor and potentially damaging it. In some embodiments, flap 90 is automatically adjusted to allow water to pass out of drain 75.

After the vehicle has moved to shallower water (e.g., a water depth less than the height of snorkel opening 55), the user can manually or digitally reset the system such that all water remaining in the valve is expelled through drain 75. Valve 65 then resets to the open position and air can be routed from opening 55 to valve outlet 71.

The disclosed system offers many advantages over the prior art. For example, by diverting water away from major vehicle components, the disclosed system easily and effectively prevents major damage to vehicle motors when an ATV is used in deep water.

In addition, the disclosed system can be easily retrofitted and installed on a wide variety of vehicles (e.g., Jeeps, 4-wheelers, etc.).

The disclosed system can save users thousands of dollars in needless engine repairs by preventing exposure to water.

Valve 20 is automatically triggered when exposed to a pre-determined depth of water. The valve requires no input from the operator, which streamlines use and eliminates operator error in failing to open the drain.

The valves are 3-way valves that effectively divert water away from the vehicle system when water enters the snorkel.

System 5 can be easily reset when desired by the user to drain excess water from the valves and have the valve outlet open and re-connected to the vehicle motor.

The foregoing descriptions have been presented for purposes of illustration and description and are not intended to be exhaustive or to limit the presently disclosed subject matter. Many modifications and variations are possible in light of the present disclosure.

What is claimed is:

1. A snorkel system for use with a vehicle, the snorkel system comprising:
   a snorkel comprising:
      a riser comprising a lower segment with a first open end, an upper segment with a second open end, a neck positioned between the lower and upper segments, and an interior channel that spans the distance between the first and second open ends;
      a water sensor positioned in the riser neck; and
   a housing comprising:
      a three-way valve defined by an inlet, an outlet, and a drain, wherein the three-way valve is switchable between a first position in which the inlet is selectively in fluid communication with the outlet and a second position in which the inlet is selectively in fluid communication with the drain;
      a motor that drives the three-way valve to switch between the first position and the second position,
   wherein the motor controls each three-way valve simultaneously.

2. The snorkel system of claim 1, wherein the snorkel further comprises a base operatively connected to the first open end of the riser.

3. The snorkel system of claim 1, wherein the three-way valve drain comprises a flap covering the drain when the three-way valve is in the first position.

4. The snorkel system of claim 1, further comprising a filter positioned at the valve inlet.

5. The snorkel system of claim 1, wherein the housing comprises 1, 2, or 3 three-way valves.

6. The snorkel system of claim 1, wherein the water sensor extends through a face of the riser.

7. The snorkel system of claim 1, wherein the snorkel further comprises a screen that at least partially surround the water sensor within the neck.

8. The snorkel system of claim 1, wherein the second open end comprises a lip or overhang.

9. The snorkel system of claim 1, further comprising a control unit that allows the valve to be reset to the first position.

10. A method of diverting water through a snorkel system, the method comprising:
    positioning a three-way valve of the snorkel system in a first position, wherein the snorkel system comprises:
       a riser comprising a lower segment with a first open end, an upper segment with a second open end, a neck positioned between the lower and upper segments, and an interior channel that spans the distance between the first and second open ends;
       a water sensor positioned in the riser neck; and
    a housing comprising:
       a three-way valve defined by an inlet, an outlet, and a drain, wherein the three-way valve is switchable between a first position in which the inlet is selectively in fluid communication with the outlet and a second position in which the inlet is selectively in fluid communication with the drain;
       a motor that drives the three-way valve to switch between the first position and the second position;
    receiving water in the interior channel of the riser, whereby the water activates the water sensor, triggering the motor to move the three-way valve to the second position;
    channeling the water from the snorkel to the three-way valve, thereby diverting water from the system through the drain,
    wherein the motor controls each three-way valve simultaneously.

11. The method of claim 10, wherein the outlet is operably connected to a vehicle motor.

12. The method of claim 10, wherein the vehicle is an all-terrain vehicle.

13. The method of claim 10, wherein the motor moves a flap to expose the drain when the three-way valve transitions to the second position.

14. The method of claim 10, further comprising passing the water through a filter positioned at the valve inlet prior to entering the three-way valve.

15. The method of claim 10, wherein the housing comprises 1, 2, or 3 three-way valves.

16. The method of claim 10, wherein the snorkel second open end comprises a lip or overhang.

17. The method of claim 10, wherein the system further comprises a control unit that allows the valve to be reset to the first position.

18. A snorkel system for use with a vehicle, the snorkel system comprising:
    a snorkel comprising:
       a riser comprising a lower segment with a first open end, an upper segment with a second open end, a neck positioned between the lower and upper segments, and an interior channel that spans the distance between the first and second open ends;
       a water sensor positioned in the riser neck; and
    a housing comprising:
       a three-way valve defined by an inlet, an outlet, and a drain, wherein the three-way valve is switchable between a first position in which the inlet is selectively in fluid communication with the outlet and a second position in which the inlet is selectively in fluid communication with the drain;
       a motor that drives the three-way valve to switch between the first position and the second position; and
       a connector shaft that joins the motor and each three-way valve.

19. The snorkel system of claim 18, wherein the snorkel further comprises a base operatively connected to the first open end of the riser.

20. The snorkel system of claim 18, wherein the three-way valve drain comprises a flap covering the drain when the three-way valve is in the first position.

* * * * *